(12) United States Patent
Smith

(10) Patent No.: US 6,604,104 B1
(45) Date of Patent: Aug. 5, 2003

(54) SYSTEM AND PROCESS FOR MANAGING DATA WITHIN AN OPERATIONAL DATA STORE

(75) Inventor: Walter Smith, Marrietta, GA (US)

(73) Assignee: SBI Scient Inc., Chicago, IL (US)

( * ) Notice: Subject to any disclaimer, the term of this patent is extended or adjusted under 35 U.S.C. 154(b) by 81 days.

(21) Appl. No.: 09/711,071

(22) Filed: Nov. 14, 2000

Related U.S. Application Data

(60) Provisional application No. 60/236,725, filed on Oct. 2, 2000.

(51) Int. Cl.$^7$ ............................................. G06F 17/30
(52) U.S. Cl. ........................... 707/10; 705/37; 370/60; 358/434; 379/88.06
(58) Field of Search ........................... 705/37; 370/60; 358/434; 379/88.06; 707/10

(56) References Cited

U.S. PATENT DOCUMENTS

| | | | |
|---|---|---|---|
| 5,446,885 A | | 8/1995 | Moore et al. |
| 5,621,727 A | * | 4/1997 | Vaudreuil .................... 370/60 |
| 5,835,758 A | | 11/1998 | Nochur et al. |
| 5,855,014 A | | 12/1998 | Smith |
| 5,920,404 A | * | 7/1999 | Weiser ....................... 358/434 |
| 5,982,856 A | * | 11/1999 | Cohn et al. .............. 379/88.06 |
| 6,064,977 A | | 5/2000 | Haverstock et al. |
| 6,073,109 A | | 6/2000 | Flores et al. |
| 6,092,086 A | | 7/2000 | Martin et al. |
| 6,192,354 B1 | | 2/2001 | Bigus et al. |
| 6,249,291 B1 | | 6/2001 | Popp et al. |
| 6,256,651 B1 | | 7/2001 | Tuli |
| 2001/0052108 A1 | | 12/2001 | Bowman-Amuah |
| 2002/0019797 A1 | * | 2/2002 | Stewart et al. ................ 705/37 |

OTHER PUBLICATIONS

PCT–International Search Report dated Jan. 24, 2002 for application No. PCT/US01/30632 filed Oct. 2, 2001.

\* cited by examiner

*Primary Examiner*—Charles Rones
(74) *Attorney, Agent, or Firm*—Hunton & Williams LLP

(57) ABSTRACT

A system and method for managing the transfer of data within an operational store is disclosed. Data from a plurality of distributed data sources is received at a messaging workflow module. The messaging workflow module prioritizes incoming and outgoing data and requests for data. Data is transferred from messaging workflow module to a translation module which ensures that the data is in a proper format for the operational data store. Data is transferred from translation module to the operational data store.

26 Claims, 8 Drawing Sheets

SYSTEM AND PROCESS FOR MANAGING DATA WITHIN AN OPERATIONAL DATA STORE

RELATED APPLICATIONS

This application claims priority from U.S. Provisional Application Ser. No. 60/236,725, filed on Oct. 2, 2000.

FIELD OF INVENTION

This invention relates to a system and process for managing data within an operational data store, and more particularly for managing the flow and processing of data from multiple distributed data sources to an operational data store.

BACKGROUND OF THE INVENTION

With numerous application systems residing within a single enterprise, integration has often been an enormous challenge for systems administrators. As businesses move online, the task of unifying disparate application systems may become even more difficult.

The Internet, new business-to-business transactions, and the creation of virtual business communities and distributed enterprise entities has caused a renewed explosion of application-integration challenges. These communities bring together systems of all shapes and sizes, and with them the various database schema and application logic of many corporations. In order for a virtual corporation to operate successfully, a unified view of the virtual enterprise may be required.

SUMMARY OF THE INVENTION

An object of the present invention is to overcome these and other drawbacks in existing systems and methods.

Another object of the invention is to provide a system and process for managing data from a plurality of distributed data sources.

Additional objects and advantages of the invention will be set forth in part in the description, or may be learned by practice of the invention. The objects and advantages of the invention may be realized and attained by means of instrumentalities and combinations particularly pointed out in the appended claims. To achieve these objects and in accordance with the purpose of the invention, as embodied and broadly described herein, a system for unifying data from disparate applications may comprise a plurality of data source modules for providing data in a plurality of data formats; an operational data store module for storing the data; a messaging workflow module for managing: a) a transfer of data to and from the operational data store module and the plurality of data sources; and b) a prioritization of the transfer of the data within the system; and a translation module for processing the data, wherein processing the data includes converting the data in the plurality of data formats from the plurality of data source modules into a data format for the operational data store module.

According to another embodiment of the invention, an information managing and translation system for data received from a plurality of distributed data sources for storage in an operational data store module, the system may comprise a messaging workflow module for managing data, where managing the data comprises receiving the data from the plurality of distributed data sources, prioritizing the received data, and transmitting the received data based on the prioritization; and a translation module for translating data into a specified data format; wherein the translation module receives the prioritized data from the messaging workflow module, translates the prioritized data into a specified format, and transmits the data to the operational data store module.

In a further embodiment of the invention, a method for unifying data from disparate applications for an operational data store module may comprise the steps of receiving data from a plurality of data source modules, where the data is in a plurality of data formats; prioritizing the transfer of the received data to a translation module; and transferring the received data to the translation module, where the data is translated from the plurality of data formats into an appropriate format for storage in the operational data store module.

According to another embodiment of the invention, a method for unifying data from disparate applications for an operational data store module may comprise the steps of receiving a plurality of requests for data from a plurality of output modules, where each output module requires data in one of a plurality of formats; prioritizing the transfer of the plurality of requests to an operational data store module; transferring the plurality of requests to the operational data store; receiving data based on the requests, where the data for each request has been translated by a translation module to a format required by the output module that made the request; and transferring the received data to the appropriate output module.

The accompanying drawings, which are incorporated in and constitute a part of this specification, illustrate an embodiment of the invention and, together with the description, serve to explain the principles of the invention.

DETAILED DESCRIPTION OF THE PREFERRED EMBODIMENTS

Figure 1:
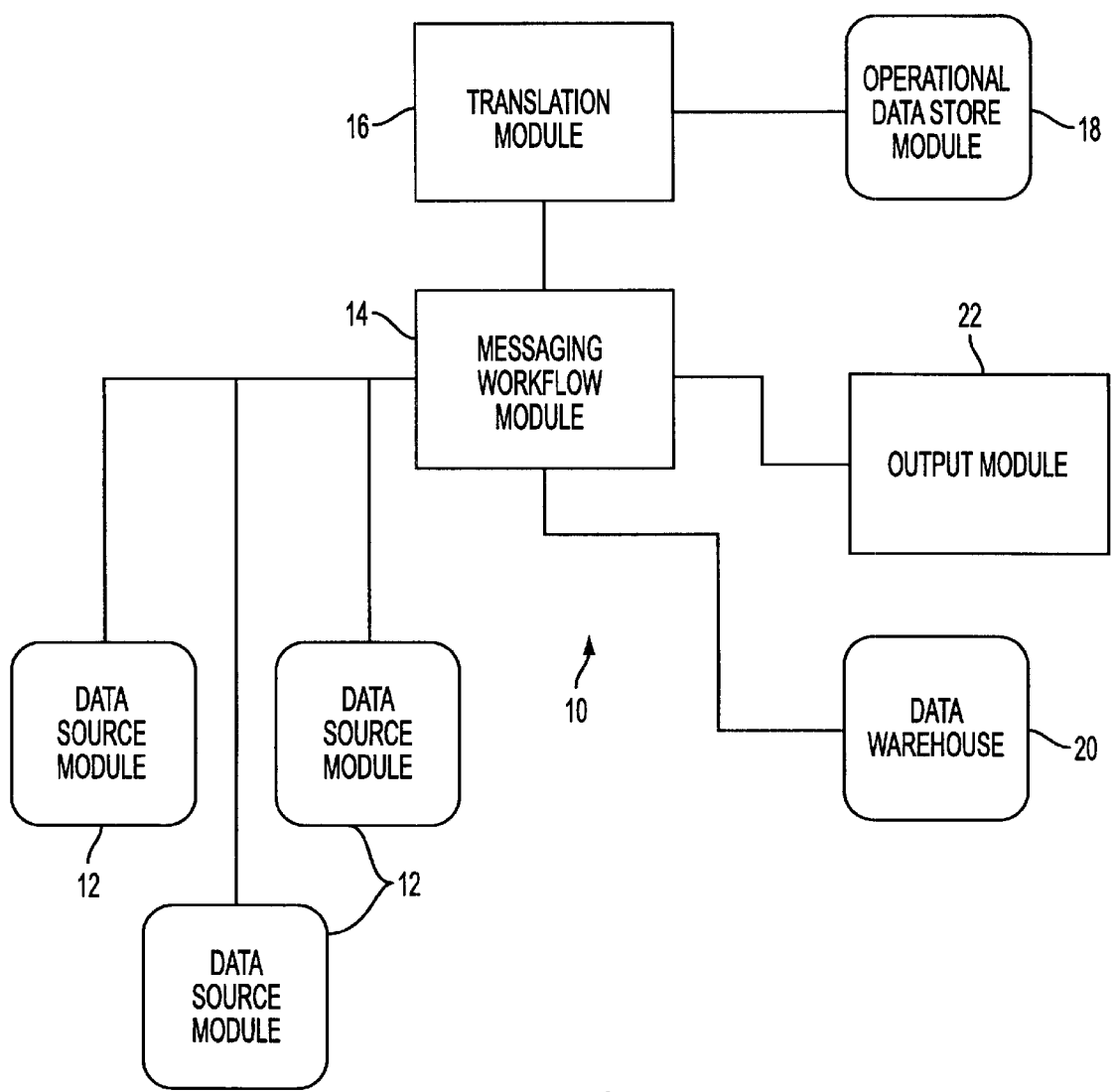
FIG. 1 is a schematic representation of a conceptual distributed operational data store system according to an embodiment of the invention.

Reference will now be made in detail to the present preferred embodiment of the invention, an example of which is illustrated in the accompanying drawings, in which like reference characters refer to corresponding elements.

FIG. 1 is a schematic representation of a conceptual distributed operational data store system 10 according to an embodiment of the invention. The conceptual distributed operational data system 10 (or CDODS 10) may include distributed source database modules 12, a message workflow module 14, a data integration translation module 16, an operational data store module 18, a data warehouse module 20, and an output module 22. According to an embodiment of the invention, distributed source database modules 10 may be logically linked to message workflow module 14 and translation module 16. Message workflow module 14 and translation module 16 may control the flow and priority of incoming and outgoing data from source distributed database modules 10, data warehouse module 20, and output modules 22. According to an embodiment of the invention, message workflow module 14 may manage the transfer of data within CDODS system 10. Data may be any type of information, including, but not limited to text, still images or photographs, video images, audio, graphics, files, executables, html code, java script, and other data and data formats.

A DODS system may incorporate at least two data storage functions—the ODS and the source data. Source data may originate in relational databases and OLTP systems in an enterprise. The DODS system may provide flexibility in viewing any data as a viable data source for the ODS. A DODS model may reduce the functional requirements for the data source to criteria selected by an enterprise. Selected criteria may include but is not limited to, ensuring that the source data is available to the data-formatting engine via a network connection.

The ODS itself may be a single database, and may typically be built on a relational engine (such as Oracle 8$i$). However, it is possible to use other types of data storage, including object-based data stores and non-relational repositories.

Figure 4:
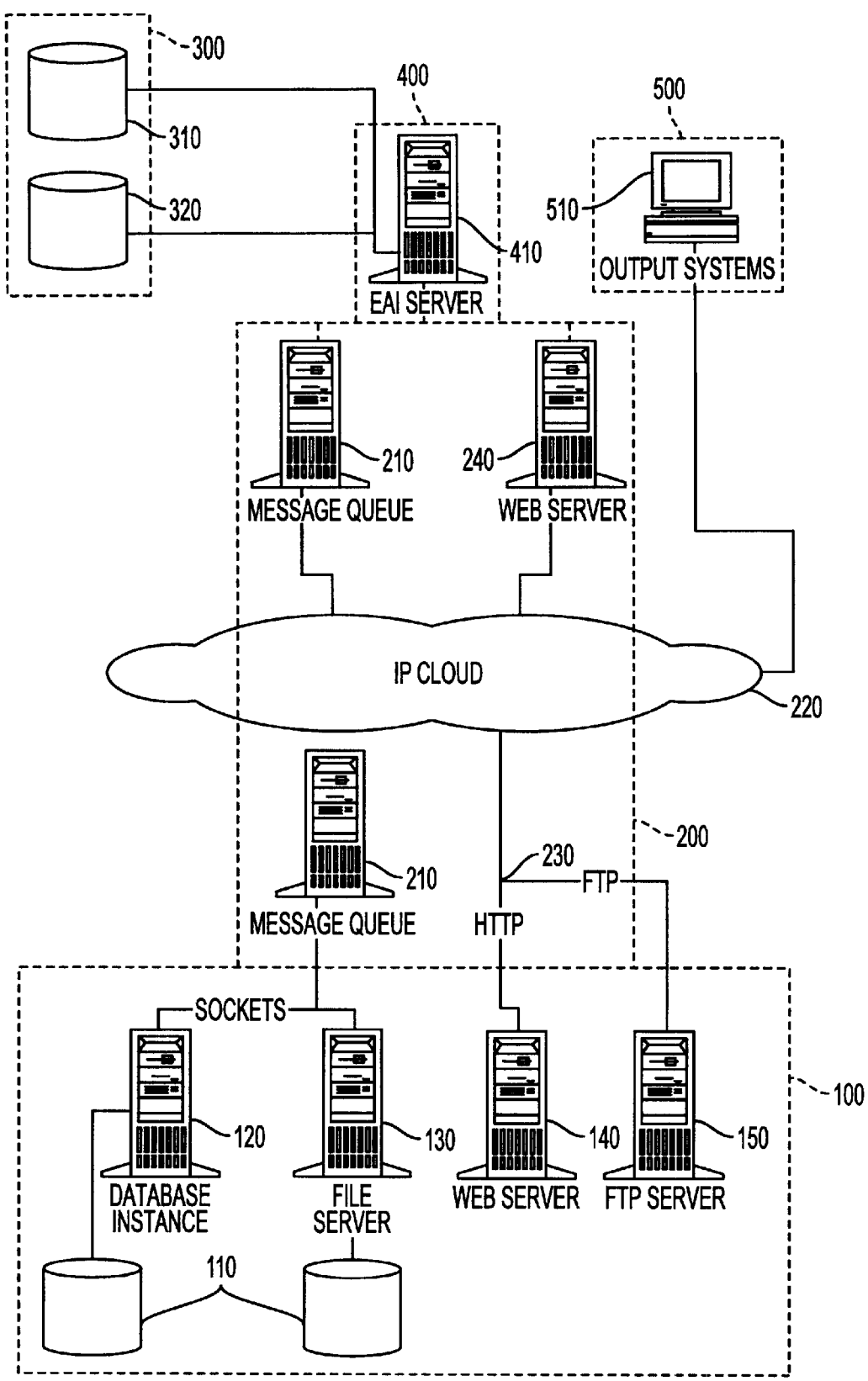
FIG. 4 is a schematic representation of a hardware system associated with an operational data store according to an embodiment of the invention.

Message workflow module 14 may ensure that no transmission of data within CDODS system 10 is lost, not received, or received incompletely at a portion of CDODS system 10. As described in greater detail below with respect to FIG. 4, message workflow module 14 may store requests, or data transmissions. According to an embodiment of the invention, message workflow module 14 may manage data flow within CDODS system 10, such as by managing data transmissions from source database modules 12 to and from translation module 16, data warehouse module 20, and output module 22.

Message workflow module 14 may manage the complexity of interfacing various data source modules (e.g., transactional systems) to the DODS. Message workflow module 14 may schedule input and output of data to and from the DODS and monitors the data transfer load with the DODS subsystems. Message workflow module 14 may adjust timing to the various inputs and outputs to optimize the performance of the DODS. Message workflow module 14 may also connect data source modules 12 to the DODS system and provides guaranteed delivery of the data packets between the systems, even over unreliable network connections. Queued messages may be delivered to the receiving queues and held there until message workflow module 14 is ready to process them.

Translation module 16 may reconcile data received from distributed source database modules 12 for placing in operation data source module 18. Distributed source database modules 12 may comprise a plurality of distributed source databases which provide information for CDODS system 10. Distributed source database modules 12 may be source database modules located at a plurality locations which are located apart (e.g., distributed) from each other. By way of example, a corporation may have a number of different offices located in a number of different cities, such as New York, Atlanta, San Francisco, and Chicago. Each office may include a source database module for providing data related to the corporation to an operational data store module. Other distributed source database modules 12 may also be used.

Selected criteria may also include ensuring that source data uses data semantics that are supported by the data-mapping subsystem, (e.g., translation module 16). Various types of data streams may be used as an input to the ODS, even if one or more data streams are geographically remote and under the control of another domain. Even a transactional engine may act as an input to the DODS, provided it can generate a data stream that can be interpreted by the data-mapping layer of the DODS.

According to an embodiment of the invention, distributed source database modules 12 may contain data in one or more data formats. Translation module 16 may reformat data received from distributed source database modules 12 into a format for receipt by operational data store module 18. Translation module 16 may enable operational data store module 18 to receive data from any distributed source database module 10, regardless of the format of the data. According to an embodiment of the invention, the data format used by operation data store module 18 may be any type of data format, as translation module 16 may be equipped to translate any type of data in any type of data format.

Data mapping with the DODS system may convert data streams from one format to another. In the case of source data, the original format may be converted to a format that is compliant with the ODS. To facilitate output from the ODS to other systems, the data-mapping layer may also convert the ODS format to any number of other data formats. The data-mapping layer may also provide semantic reconciliation of disparate data. In this case, an extract, transform and load (ETL) tool or enterprise application integration (EAI) tool may be used to facilitate the semantic conversions and to apply business rules to reconcile heterogeneous data elements.

Data transmitted with CDODS system 10 may be stored in data warehouse module 20. According to an embodiment of the invention, data received from source database modules 12 may be stored at data warehouse module 20 in the form the data was received from source database modules 12. Alternatively, data may be stored at data warehouse module 20 after formatting for operational data store 18 by data integrator translation module 16.

Output module 22 provides output for data. Output module 22 may enable output of data in the form the data was received from source database modules 12. Output module 22 may enable output of data after formatting for operational data store 18 by translation module 16. According to an embodiment of the invention, a user of CDODS system 10 may use output module 22 to transmit a request to operational data store 18, such as through message workflow module 14, which may manage the requests to operational data store module 18. Output module 22 may receive data in response to the request and output the data for the user. The CDODS, through messaging workflow module 14 and translation module 16, may enable the operational data store module 18 to provide data to a user at output module 22. It is understood that multiple output modules 22 may be used within the system of FIG. 4 to enable multiple users to access data. Translation module 16 may translate data from operational data store module 18 into any number of formats. An output module 22 may therefore receive data in a format acceptable to that output module 22. Thus, output modules 22 using different software or formats may receive data from the same operational data store module. Other manners for outputting data may also be used.

Figure 2:
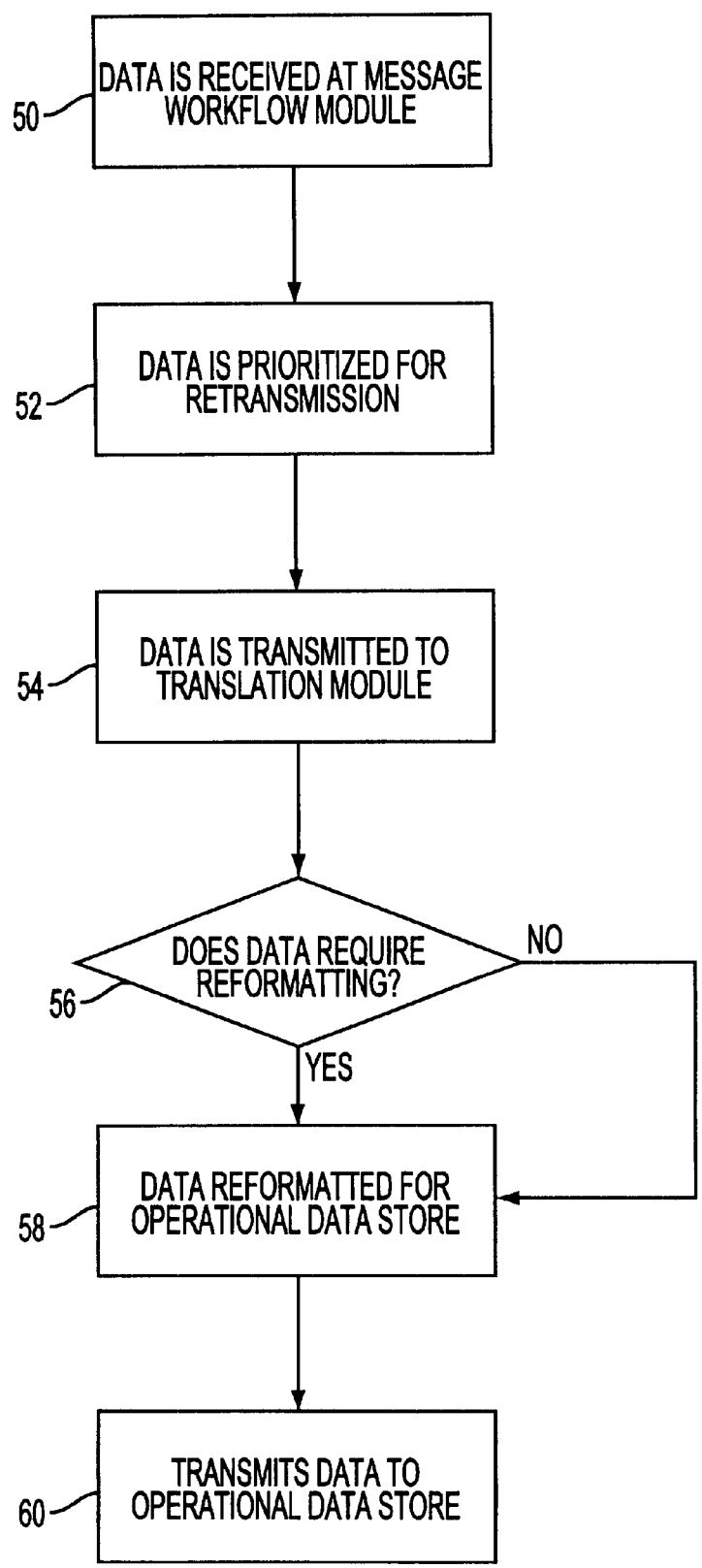
FIG. 2 is a flowchart illustrating a process for managing data in a distributed operational data store according to an embodiment of the invention.

FIG. 2 is a flowchart illustrating a process for managing data in a distributed operational data store according to an embodiment of the invention. At step 50, data from a distributed source database modules 12 is received at message workflow module 14. According to an embodiment of the invention, data is transmitted to message workflow module 14 from a plurality of distributed source database modules 12, where the data is in a plurality of formats. Data may be received in data streams, where data is constantly received at message workflow module 14. By way of example, data from each of the distributed source database modules 12 may be sent to message workflow module 14, such that message workflow module 14 received data continuously in the form of data streams, even though the distributed source database modules 12 may send data only intermittently. Other manners of transmitting and receiving data may also be used.

At step 52, message workflow module 14 manages the flow and priority of data with CDODS system 10. According to an embodiment of the invention, message workflow module 14 may manage the flow of data received from the distributed source database modules 12. Managing the data flow may include determining what portions of data or data streams are forwarded on to other parts of CDODS system 10, storing data for later transmission to other portions of CDODS system 10 (e.g., operational data store module 18), the order in which data is forwarded to other parts of CDODS system 10, and other types of management of CDODS system 10.

At step 54, data received at message workflow module is transmitted to and received by translation module 16. As described above, message workflow module 14 may manage the flow of data from message workflow module 14 to translation module 16, such as by prioritizing data transmitted.

At step 56, translation module 16 examines received data to determine whether the format of the data is consistent with the format of operational data store 18. If data needs to be reformatted, translation module 16 translates the data into a format for operational data store module 18 at step 58. Reformatted data, or data received at translation module 16 that did not need to be reformatted, is transmitted to operational data store module 18 at step 60.

Figure 3:
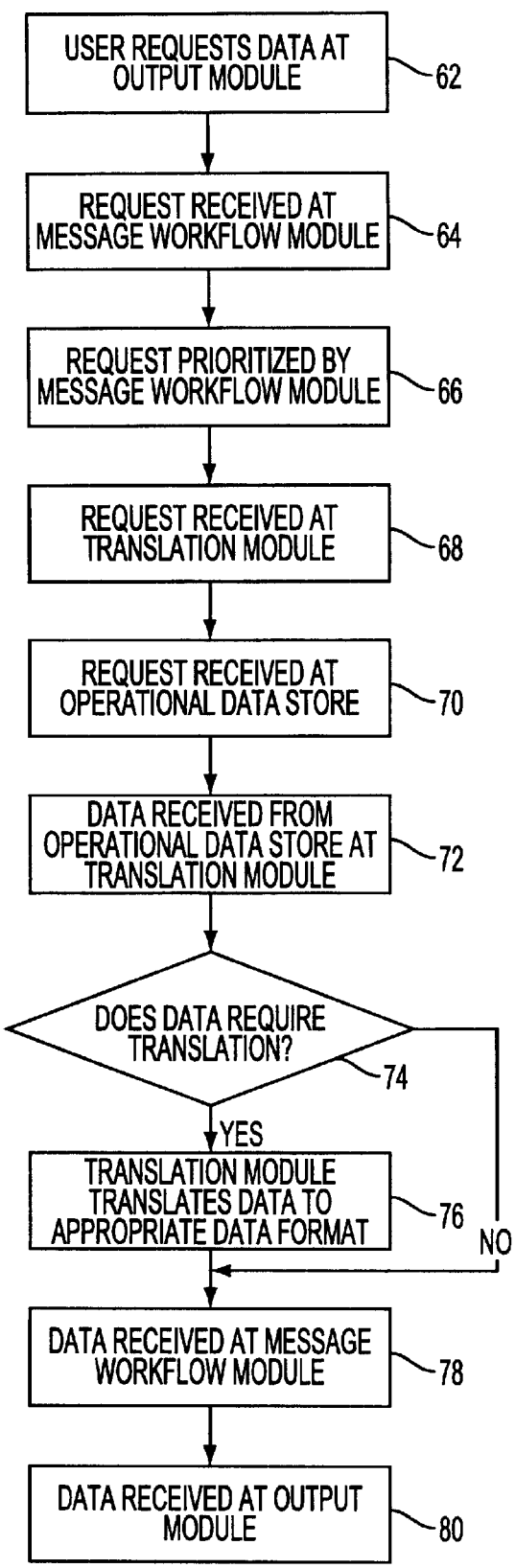
FIG. 3 is a flowchart illustrating a process for managing requests for data according to an embodiment of the invention.

FIG. 3 is a flowchart illustrating a process for requesting data according to an embodiment of the invention. At step 62, a user requests data at output module 22. A request may be any standard request for data. According to an embodiment of the invention, output module 22 may be any type of user device, such as those described in greater detail in FIG. 8.

At step 64, the request is received at message workflow module 14. At step 66, message workflow module 14 prioritizes requests. According to an embodiment of the invention, message workflow module 14 may manage the transfer of requests, determining that priority of each request and ensuring that high priority requests are transferred before lower priority requests.

A request is received at translation module 16 at step 68, and received at operational data store module 18 at step 70.

Based on the request, operational data store module 18 retrieves the requested data, and transfers the data to translation module 16.

At step 74, translation module 16 determines whether data received from operational data store module 18 needs to be translated. According to an embodiment of the invention, the format of data operational store module 18 may not enable the data to be displayed on output module 22. If data needs to be translated, the data is translated by translation module 16 at step 76. As described above, translation module 16 may be able to translate data into a plurality of different formats.

At step 78, translated data, or data that did not need to be translated, is received at message workflow module 14. Message workflow module 14 transmits the data to output module 22 at step 80, where the data may be accessed or used as applicable.

The functional architecture of the DODS may be deceptively simple, with a great deal of complexity hidden inside the functional components. Implementation of the DODS architecture may require a thorough understanding of both the practice of building ODS schema and the integration of data sources utilizing EAI and ETL tools. In practice, there are many ways to implement the functional components of the DODS. The exact method of implementation may be determined by the environmental and technical constraints of the proposed system. Factors such as security, performance, scalability and manageability may influence the implementation architecture. An overall implementation picture for a DODS system according to an embodiment of the invention is described with reference to FIG. 4.

There are many possible data sources for the DODS so as to be impossible to accurately depict them all. However, FIG. 4 portrays, by way of example only, common data source types that may be seen in an enterprise. While all of the data sources present their data across IP-based protocols in this embodiment of the invention, it is understood that other types of implementation mechanisms may be used. Further, such implementations may be wire-based, wireless, or some other form of transmission.

Source data components 100 may include storage media 110, database stream 120, file stream 130, web server 140 and FTP server 150. Database stream 120 may include data, such as ascii, unicode or binary data, or pointers to binary data in the form of URLs. Data from database stream 120 may be presented to the ODS across a network using a sockets-based protocol. File Stream 130 may include data in the form of files containing either ascii or binary data, or pointers to binary data in the form of URLs. These files may be presented to the ODS across a network using sockets-based wire protocol.

According to an embodiment of the invention, data from database stream 120 and file server 130 may be stored on one or more storage media 110. A standard data stream containing only ascii, unicode and/or and binary data, and URLs, presented across the network using standard HTTP may be received from web server 140. A standard data stream containing ascii, unicode and/or binary data, may be presented across the network using standard FTP format from FTP server 150.

The data sources may provide data in either a "push" or "pull" scenario. In a push scenario, a daemon or other device local to the source data triggers the data source to push a data stream to the ODS using the message-brokering subsystem. In a pull scenario, the message-brokering subsystem calls the appropriate data source and requests a specific data stream. According to an embodiment of the invention, this may be accomplished via a code segment that may have a prior knowledge of what data source is being requested. Combinations of push and pull scenarios can be used both among and within the data sources to provide flexibility in scheduling inputs into the ODS.

Message workflow components 200 may comprise one or more message queues 210, a network 220, a network connection 230, and a web server 240. Message workflow components 200 may ensure that the ODS is able to receive and send data faithfully, even across unreliable connections. Message workflow components 200 may provided guaranteed and non-guaranteed messaging.

In the guaranteed messaging subsystem, a message queue 210 is used to stage and deliver data streams to and from the ODS. The message queue 210 may be a commercial product, such as IBM's MQ-Series, and may place packets of data into "envelopes," stage them in a message queue 210 near their source system, and deliver them to a corresponding message queue 210 near the target system. Message queue software may guarantee that the delivery of the message will take place when there is a reliable connection between the two endpoints available. It may also store the messages in a persistent state until they can be delivered successfully and can provide notification of delivery success or failure to the originator.

In the non-guaranteed messaging subsystem, common IP-based protocols may be used to transport data packets from the source system to the target system over the Internet 220. According to an embodiment of the invention, a network connection 230 may enable portions of the system, such as web server 140 and FTP server 150, to connect to Internet 220. This scenario may be used reliably provided that the ODS is aware of and can cope with the sporadic and unreliable delivery of this type of data. FTP and HTTP may be use message packet protocols on the Internet, although it will be understood other protocols, such as SMTP, SNMP and NNTP, could be used in different implementations.

In practice, the methods of delivering data to the ODS subsystem may be widely varied and may include proprietary message delivery over sockets-based protocols. So long as the ODS subsystem is aware of and able to cope with each of these mechanisms, the actual transport mechanism should not adversely affect the performance of the DODS.

Data mapping components 400 may include an enterprise application integration (EAI) tool 410. Once the data has been delivered to the local ODS subsystem, it must be translated into an appropriate format for the ODS, and any format errors in the data must be reconciled. To accomplish this task, the DODS usually uses an EAI tool 410 and/or an extract, transform and load (ETL) tool.

EAI tool 410 may be any commercially available EAI tool 410, and enable connecting message brokers and legacy data, mapping data into any number of formats, controlling workflow of input and output data streams, and resolving semantics by applying business rules to data. ETL tools may be any commercially available ETL tools and may enable mapping data into any number of formats, and resolving semantics by applying business rules to data.

In the case of the DODS, the EAI tool 410 and/or the ETL tool may be used to provide the ODS with well-timed and accurate updates to its data from the source data systems, and to format outbound data streams from the ODS to target consumers of ODS data.

Figure 7:
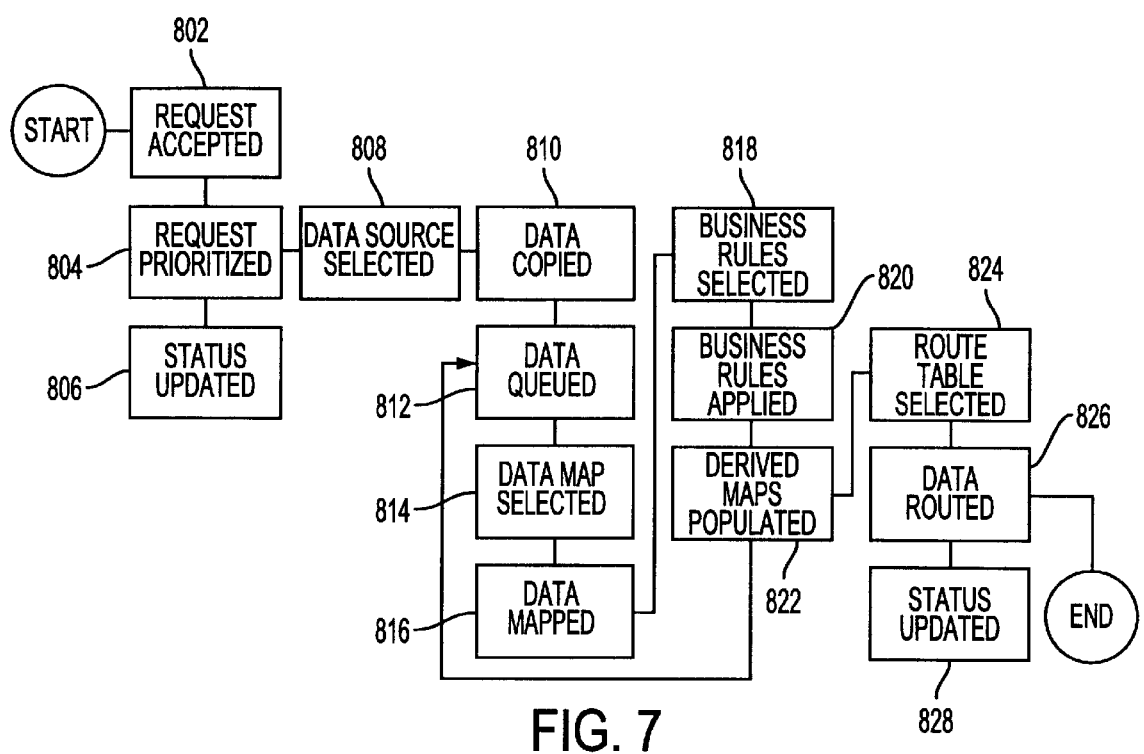
FIG. 7 is a flowchart illustrating a process for managing data transfer according to an embodiment of the invention.

EAI tool 410 and/or ETL tool may accept incoming data streams and route them through a workflow process that cleanses and organizes the data into a format that the ODS can accept. FIG. 7 shows the process flow of the EAI tool in handling both incoming and outgoing data streams for the ODS. Further explanation of the workflow continues below.

Requests are accepted at step 802, and prioritized at step 804. Requests coming to the EAI tool from source and target systems may be handled according to a workflow priority table, which controls both incoming and outgoing requests. At step 806, the status of a request may be updated. When a request reaches the top of the priority queue, its corresponding data is selected at step 808, and copied into the EAI engine input tables at step 810. Data is queued at step 812, and the message header and/or envelope is then analyzed. The information is used to select the correct map and route for the data within the ODS at step 814. At step 816, the correct syntax map is then selected and the input data mapped to the output format. A business-rules matrix is selected at step 818, and then applied to the data at step 820, where any semantic reconciliation occurs. These business rules may also result in the production of derived syntax at step 822, which in turn creates new messages that may be routed back through the EAI tool for further refinement at step 824. When all business-rules processing is complete, the route for the data is selected at step 824 and the output data format sent on the correct target (whether to the ODS or another system) at step 826. At step 828, the status of a request may be updated.

EAI tool 410 may translate data for both incoming and outgoing messages to the ODS. On the output side, it may format historical data for a data warehouse or may format messages for EIS, DSS or other transactional systems. The ODS may be isolated from the behaviors of these output systems by the EAI tool. When using an ETL tool, similar workflow functionality is available, however the connections to the message-brokering brokering system or to the legacy source data may be custom-coded by the DODS developer. Data storage components 300 may include an operation data store 310 and a data warehouse 320. As described below, the ODS may be a relational database. It contains entities that represent the current state of the operational enterprise.

An operational data store (ODS) may assist in melding applications within large enterprises, and enable greater unification of relational databases and application systems across the Internet. However, technologies and mechanisms specific to e-business, as well as the constraints of the ODS, may need to be considered when building a DODS.

Operational data stores may assist when large companies acquire and implement numerous relational databases as part of their ongoing expansions and mergers. These heterogeneous databases may contain semantics that are difficult to reconcile with application systems of the acquiring enterprise.

As a unifying platform, the operational data store may provide a dynamic view of the enterprise in near-real time. This may allow executive information systems (EIS) and enterprise transactional systems to operate against a uniform and coherent schema and/or data format, and a consistent set of semantics coming from the ODS.

An ODS may be subject-oriented, integrated within an enterprise, volatile with near-real time data flow, and contain only designated corporate detailed data. This may differentiate the ODS from a data warehouse, which is generally not volatile or subject-oriented, and which contains historical data about transactions in the enterprise. It also may differentiate the ODS from an application database, which is not integrated with the rest of the enterprise, and which contains both historical and current values.

The ODS apart may characterize operational information of an enterprise in a single, unified schema. Records comprising data may be dynamically updated, such as in near-real time, and these records may reflect the current operational state of all units of the enterprise (or as close as operational constraints will allow). The ODS may assist in providing a unified view of many aspects of an enterprise and may include entities such as customers, shipping points and partners, and activities such as accounting, inventory, sales and purchases.

Figure 5:
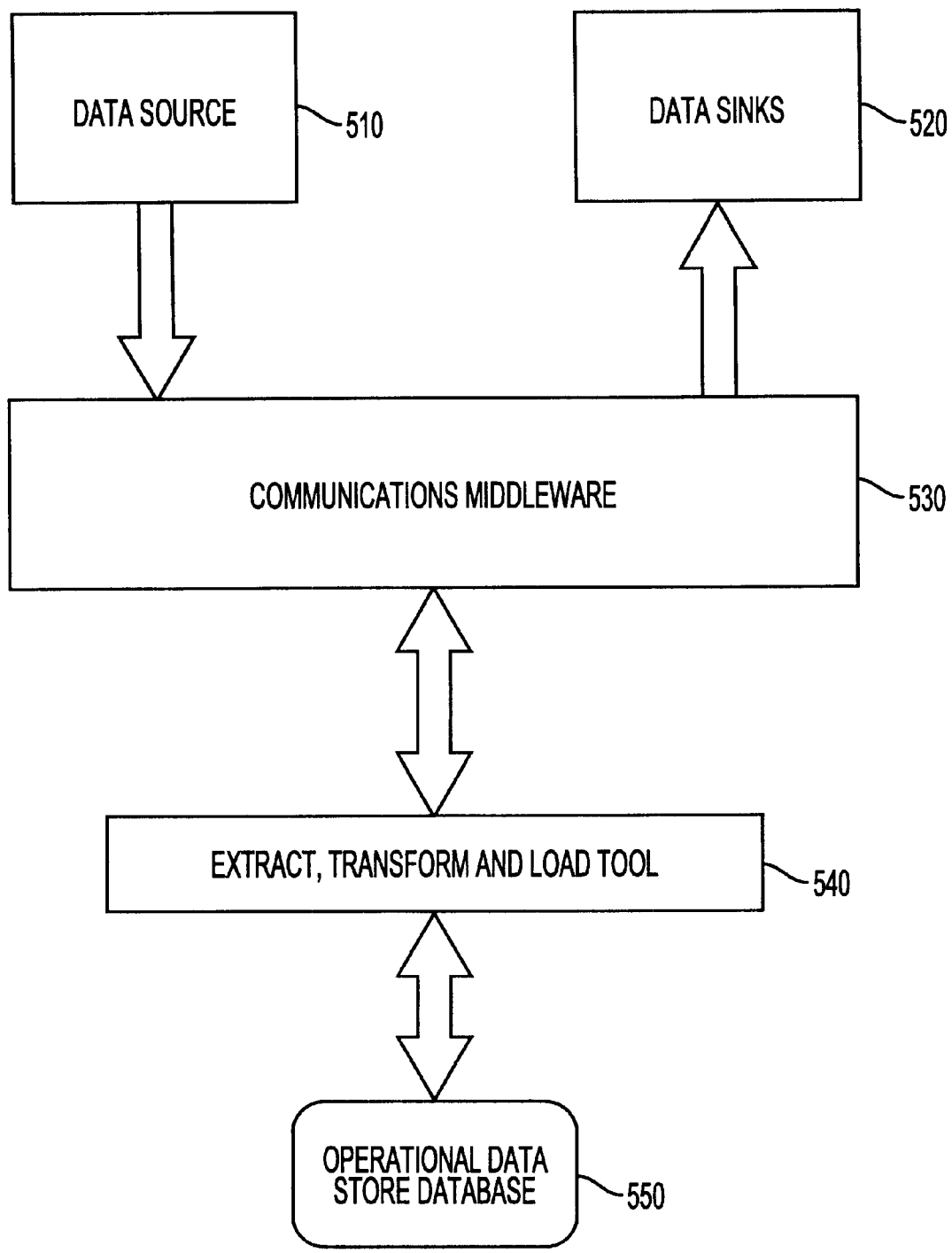
FIG. 5 is a schematic representation of the functional architecture of an to operational data store according to an embodiment of the invention.

In practice, operational data stores may be implemented as a single, relational database connected to the other enterprise systems via an extract transform and load (ETL) tool. FIG. 5 illustrates the typical functional architecture. Where the ODS accepts data from the other enterprise systems, such as in the form of asynchronous, batch updates in near-real time. Enterprise information systems (EIS) and decision support systems (DSS) may then access the ODS directly to extract business metrics and/or information for the enterprise. Online transaction processing (OLTP) systems may also access the ODS to gain a global enterprise view of key information such as customer, account or financial data. Access to the ODS may be in near-real time or in other time frames.

As illustrated in FIG. 5, a data source 510 (e.g, a data source module 12) may provide data to communications middleware module 530. Communications middleware module 530 may interact with data source 510 and data sinks 520 (e.g., output module 20) to receive data from data sources 510 and transmit data to data sinks 520. Communications middleware module 530 may be an conventional communications middleware module 530 for managing the receipt and transfer of data. ETL tool 540 may transfer data between communications middleware module 530 and operational data store database 550. Other configurations for an ODS may also be used.

According to an embodiment of the invention, the ODS may provide benefits in terms of accuracy and availability of key business metrics to a large enterprise. The architecture of the ODS in the present invention may be suited to an enterprise with large numbers of distributed data sources.

Figure 6:
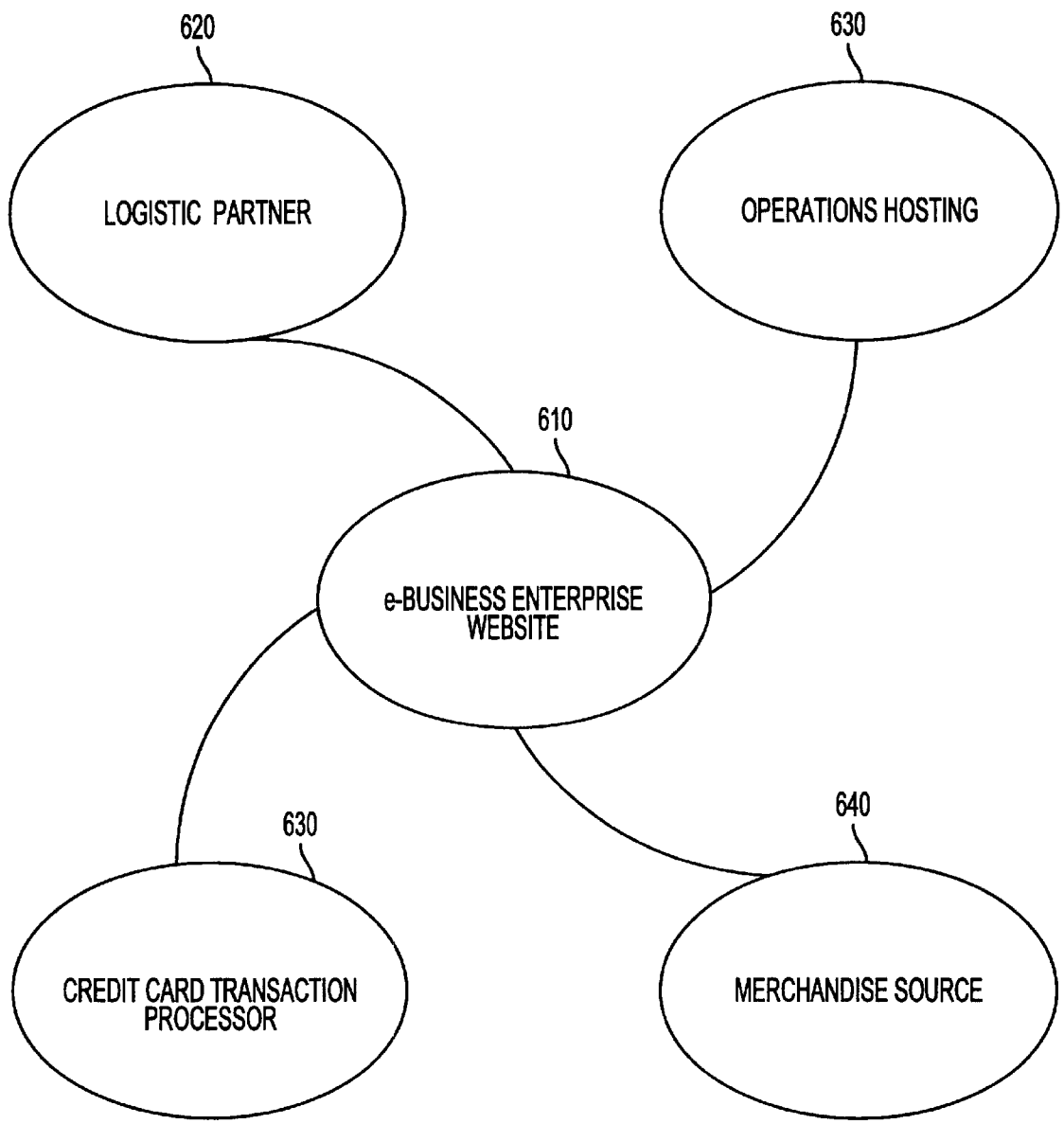
FIG. 6 is a schematic representation of an enterprise that may use an operational data store according to an embodiment of the invention.

An example business scenario describes a typical e-business enterprise, which is illustrated in FIG. 6. Partners within the enterprise may be widely distributed geographically, and may provide transactional and operational information to the e-business enterprise in the form of data feeds and real-time messages. In this environment, the ODS can provide a unified view of all aspects of the e-business enterprise in near-real time. According to an embodiment of the invention, an e-business enterprise may operate under certain constraints that will heavily influence the architecture of an ODS.

An e-business enterprise may have an e-Business Enterprise Website 610 used as an ODS, with logistic partners 620, operations hosting 630, credit card transaction processor 640, and merchandise source 650 located in distributed locations. Partners may be loosely coupled to the e-business enterprise over non-reliable and non-secure connections. Partner data formats may also extend beyond traditional database formats to XML, EDI, PIP and other formats. For many e-business enterprise, the enterprise cannot control changes to the partner schema, or the latency of the partner systems. However, the e-business operator may desire to control the latency of its systems despite all of the above constraints. To cope with these elements, a distributed operational data store (DODS) may accept inputs that are sporadic and diverse, and provide an output that is consistent with the known current view of the system at a point in time.

When implementing a DODS system, several other considerations may influence the architecture of the system. In a traditional ODS system, the source and target data systems are typically co-located on a private, secure wide area network (WAN) or local area network (LAN) within a corporate entity. This may not be the case for the DODS. Source and target systems in a DODS environment may exist on multiple WANs and LANs. In addition, communications between the source and target systems may take place across the public Internet. For this reason, it may be important to consider the security implications of developing a DODS system, as noted below. Additionally, the physical and logical protocol connections between the source and target systems may be evaluated and made secure using known encryption and connection validation technologies. Secured socket layering (SSL) and secure HTTP (SHTTP) are two of the many technologies available for safeguarding such connections. Firewalls and other physical access restriction mechanisms may be used between networks and nodes on the system to ensure connection security at the endpoints.

The data traveling between nodes in a DODS system may be likely to have some value to the enterprise, and therefore it may be necessary to consider the security implications of having that data compromised at any node. Databases in the DODS system may be secured using the authorization mechanisms provided by the original equipment manufacturer (OEM) for the database. File servers may employ access control lists (ACL), user role, group or other authorization mechanisms to prevent unauthorized access to the data. Message queues and Web servers may employ limited access and auditing mechanisms to ensure that temporarily stored data is not compromised while traveling between nodes. Additionally, access to the DODS servers and systems may be restricted by a authentication mechanism, such as KERBEROS. The use of digital certificates, smart cards or other devices as an authentication mechanism may increase the protection afforded to the system, especially where computer processes will proxy for human users.

Auditing functions may also be used in the security zone of the DODS. Entries may be audited to ensure that entries have not been tampered with. Updates to the ODS may be audited to ensure that they are truly reflective of the business transactions in the originating system. An automated auditing mechanism may be set up to routinely compare the results in the ODS with the originating system.

According to an embodiment of the invention, in an e-business enterprises, the DODS may be a primary source for aggregated, near-real-time data about the enterprise. If this case, the reliability of the system may be a core consideration of the implementation. The DODS may need to be available during the working hours of the users of the system, and may need to have minimal down time and outages of service during those periods. The DODS system may be implemented using redundant components wherever required to guarantee availability. Components of the system such as the Web, EAI and file servers may have multiple instances arranged in a highavailability configuration. Additionally, multiple network routes may be provided between critical components of the system and databases may be configured to provide redundant access to the volumes of data.

Further, in a DODS system, output performance of the system may be coupled to the EAI servers, which are also participating in the input processing to the system. According to an embodiment of the invention, the system may be designed with workflow optimization as a critical factor. The prioritization of tasks in the workflow may be carefully analyzed, with those tasks that affect perceived user performance given high enough priority to satisfy the requirements. Tasks in the system that are non-critical may be deferred to off-peak hours. Wherever possible, tasks may be performed asynchronously to reduce latency in the system. System-performance profiling may be carried out in the development life cycle. This profiling may be performed whenever the workflow or data schema in the system is altered significantly.

Another consideration in the system may be how well it will scale with the addition of entities to the ODS schema, or with the addition of transactions to the input and output workflow processes. The use of database-profiling tools may be used to ensure that the database is scaling to the changing requirements of the system. The network may also utilize a performance-monitoring scheme to ensure that bottlenecks are not occurring in the network, which could adversely impact the user experience. As the DODS grows, this performance monitoring should continue on a routine basis.

With the advent of the Internet and e-business, the distributed operational data store may provided a mechanism for aggregating and analyzing the daily activities and key constructs of an enterprise. An effective mechanism for leveraging the power of existing and emerging data sources to provide a similar view of the distributed enterprise may also be provided. EAI software may allow the DODS to pull data from disparate data sources across the enterprise, and then aggregate that data. Business rules can be applied to the data, and semantic and syntactical changes can be made to the data. The results can be routed to any node on the network to be utilized by many enterprise systems such as EIS, DSS and data warehouses.

Figure 8:
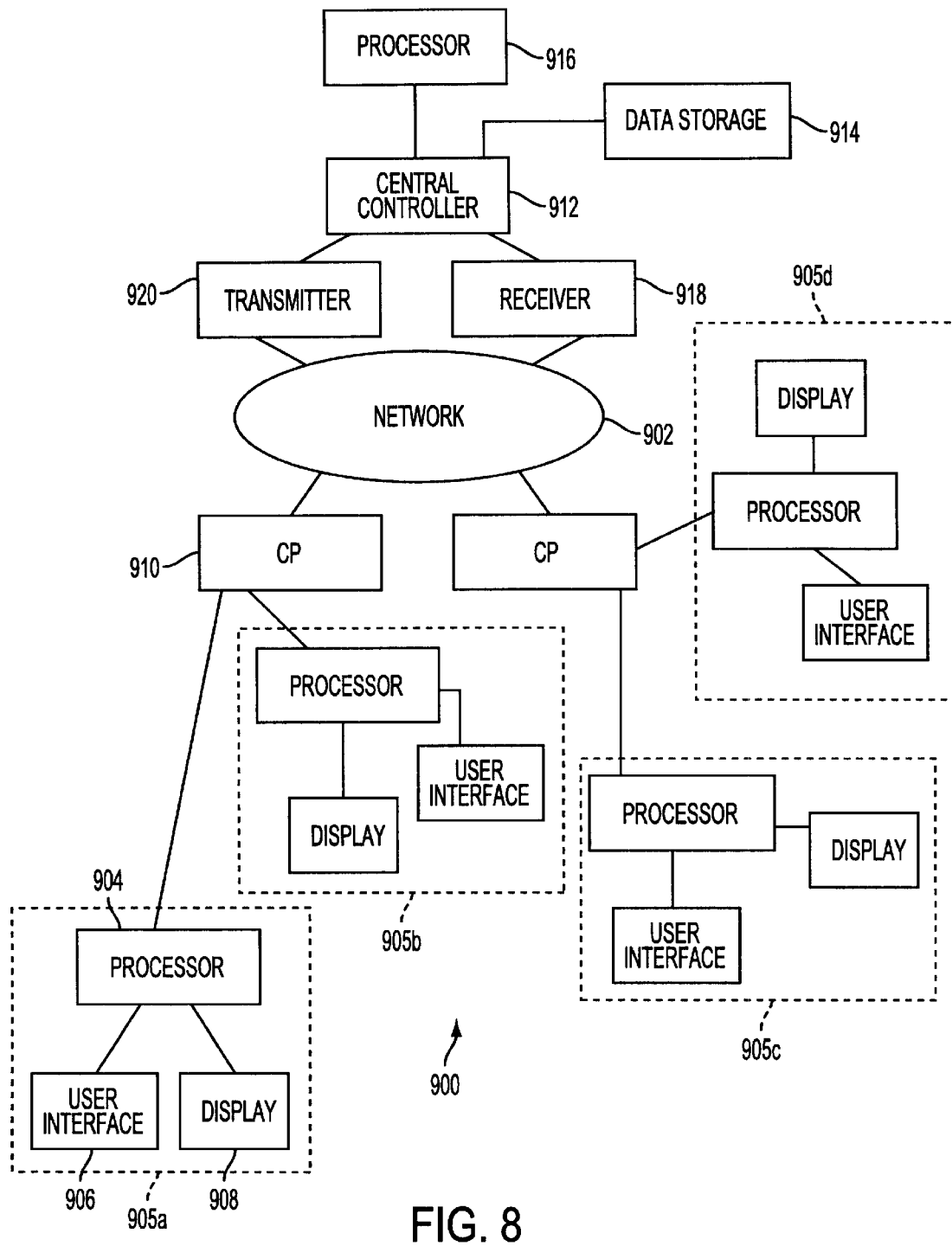
FIG. 8 is a schematic representation of a system for accessing an operational data store according to an embodiment of the invention.

FIG. 8 illustrates a System 900 according to an embodiment of the present invention. System 900 comprises multiple end user devices 905a–905d (or "computers") used by borrowers to connect to Network 902 through multiple Connector Providers (CPs) 910. Network 902 may be any network that permits multiple borrowers or computers to connect and interact. According to an embodiment of the invention, Network 902 may be comprised of a dedicated line to connect borrowers, such as the Internet, an intranet, a local area network (LAN), a wide area network (WAN), a wireless network, or other type of network. CP 910 may be a provider that connects the borrowers to the Network 902. For example, CP 910 may be an internet service provider (ISP), a dial-up access means, such as a modem, or other manner of connecting to network 902. In actual practice, there may be significantly more CP's 910 connected to System 900 than shown in FIG. 8. This would mean that there would be additional borrowers which are connected through the same CPs shown or through other CPs. Nevertheless, for purposes of illustration, the discussion will presume four end user devices 905a–905d are connected to Network 902 through two CPs 910.

According to an embodiment of the invention, end user devices 905a–905d may each make use of any device (e.g., computer, wireless telephone, personal digital assistant, etc.) capable of accessing Network 902 through CP 910. Alternatively, some or all of end user devices 905a–905d may access Network 902 through a direct connection, such as a T1 line, or similar connection. FIG. 8 shows four end user devices 905a–905d, each having a connection to Network 902 through a CP 910a and 910b. End user devices 905a–905d may each make use of a personal computer such as a computer located in the borrower's home, or may use other devices which allow the borrower to access and interact with others on Network 902. Central controller module 920 may also have a connection to Network 902 as described above. Central controller module 920 may communicate with one or more data storage modules 935, the latter being discussed in more detail below.

Each computer 905a–905d used by borrowers may contain a processor module 904, a display module 908, and a user interface module 906. Each computer 905a–905d may have at least one user interface module 906 for interacting and controlling the computer. The user interface module 906 may be comprised of one or more of a keyboard, joystick, touchpad, mouse, scanner or any similar device or combination of devices. Each of the computers 905a–905d used by requesters may also include a display module 908, such as a CRT display or other device.

System 900 further includes a central controller module 920. Central controller module 920 may maintain a connection to Network 902 such as through network device 915. Network device 915 may comprise a conventional device which enables central controller module 920 to interact with Network 902. According to an embodiment of the invention, network device 915 may be integral with central controller module 920. The connection to Network 902 by central controller module 920 and computers 905a–905d may be a high speed, large bandwidth connection, such as a though T1 or T3 line, a cable connection, a telephone line connection, DSL connection, or other type connection. Central controller module 920 functions to permit borrower devices 905a–905d to interact with each other in connection with various applications, messaging services and other services which may be provided through System 900.

Central controller module 920 preferably comprises either a single server computer or a plurality of multiple server computers configured to appear to end user devices 905a–905d as a single resource. Central controller module 920 communicates with one or more data storage modules 935. According to an embodiment of the invention, a data storage module 935 may be located on one or more data storage devices, where the data storage devices are combined or separate from central controller module 920.

While System 900 of FIG. 8 discloses a computer 905a–905d connected to Network 902, it is understood that a personal digital assistant ("PDA"), a mobile telephone, a television, or other device that permits access to Network 902 may be used to arrive at the system of the present invention.

According to another embodiment of the invention, a computer-usable and computer-writeable medium having a plurality of computer readable program code stored therein may be provided for practicing the method of the present invention. For example, the computer-usable medium may comprise a CD ROM, a floppy disk, a hard disk, or any other computer-usable medium. One or more of the components of the system may comprise computer readable program code in the form of functional instructions stored in the computer-usable medium such that when the computer-usable medium is installed on a computer system, those components cause the computer system to perform the functions described.

According to one embodiment, central controller module 920, application creating module 925, payment module 930, data storage 935, network device 915, data source module 12, message workflow module 14, translation module 16, operational data store module 18, data warehouse module 20, output module 22, and other architecture described herein may comprise computer-readable code that, when installed on one or more computers or computer systems, perform the functions described above. Also, only some of the components may be provided in computer-readable code.

According to one specific embodiment of the present invention, a system may comprise components of a software system. The system may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A method for unifying data from disparate applications for an operational data store module, the method comprising the steps of:
   receiving data from a plurality of data source modules, where the data is in a plurality of data formats;
   prioritizing the transfer of the received data to a translation module;
   transferring the received data to the translation module, where the data is translated from the plurality of data formats into an appropriate format for storage in the operational data store module, where the operational data store comprises one or more relational databases; and
   transmitting the stored data from the operational data store module in response to a query request.

2. The method according to claim 1, where the operational data store module provides dynamic access to the data in real-time.

3. The method according to claim 1, where prioritizing the transfer of data further includes storing data for transfer at a later time.

4. A method for unifying data from disparate applications for an operational data store module comprising the steps of:
   receiving a plurality of requests for data from a plurality of output modules, where each output module requires data in one of a plurality of formats and where each of the plurality of requests is a query;
   prioritizing the transfer of the plurality of requests to an operational data store module, where the operational data store module comprises one or more relational databases;
   transferring the plurality of requests to the operational data store;
   receiving data based on the requests, where the data for each request has been translated by a translation module to a format required by the output module that made the request;
   transferring the received data to the appropriate output module.

5. The method according to claim 4, further comprising the step of prioritizing the transfer of the received data.

6. The method according to claim 5, where prioritizing the transfer of the received data further includes storing data for transfer at a later time.

7. The method according to claim 4, further including a data warehouse for storing data received from the messaging workflow module, where the messaging workflow module transfers the data to the data warehouse per instructions from one or more of the plurality of output modules.

8. The method according to claim 4, where the operational data store module provides dynamic access to the data in real-time.

9. The method according to claim 4, where prioritizing the transfer of the plurality of requests further includes storing one of the plurality of requests for transfer at a later time.

10. One or more computer readable media, the one or more computer readable media storing computer readable code executable to perform a method for unifying data from disparate applications for an operational data store, the method comprising:
    receiving a plurality of requests for data from a plurality of output modules, where each output module requires data in one of a plurality of formats and each of the plurality of requests is a query;
    prioritizing the transfer of the plurality of requests to an operational data store module, where the operational data store module comprises one or more relational databases;
    transferring the plurality of requests to the operational data store;
    receiving data based on the requests, where the data for each request has been translated by a translation module to a format required by the output module that made the request; and
    transferring the received data to the appropriate output module.

11. One or more computer readable media, the one or more computer readable media storing computer readable code executable to perform a method for unifying data from disparate applications for an operational data store module, the method comprising the steps of:
    receiving data from a plurality of data source modules, where the data is in a plurality of data formats;
    prioritizing the transfer of the received data to a translation module;
    transferring the received data to the translation module, where the data is translated from the plurality of data formats into an appropriate format for storage in the operational data store module, where the operational data store module comprises one or more relational databases; and
    transmitting the stored data from the operational data store module in response to a query request.

12. A system for unifying data from disparate applications comprising:
    a plurality of data source modules for providing data in a plurality of data formats;
    an operational data store module for storing the data, wherein the operational data store module comprises one or more relational databases;
    a messaging workflow module for managing:
      a) a transfer of data to and from the operational data store module and the plurality of data sources; and
      b) a prioritization of the transfer of the data within the system;
      c) transmission of data from the operational data store module in response to a query request; and
    a translation module for processing the data, wherein processing the data includes converting the data in the plurality of data formats from the plurality of data source modules into a data format for the operational data store module.

13. The system according to claim 12, wherein managing the transfer of data further comprises the step of managing the transfer of data from the plurality of data source modules to the translation module.

14. The system according to claim 13, wherein managing the transfer of data further comprises prioritizing the transfer of data from each of the plurality of data source modules to the translation module.

15. The system according to claim 12, wherein managing the transfer of data further comprises prioritizing the transfer of data from each of the plurality of data source modules to the translation module.

16. The system according to claim 12, further comprising a plurality of output modules for accessing data from the operational data store module, wherein each of the plurality of output modules receives data in one of the plurality of formats and the translation module translates the data from the operational data store into the appropriate format for each of the plurality of output modules.

17. The system according to claim 16, wherein managing the transfer of data further comprises prioritizing the transfer of data from the translation module to each of the plurality of output modules.

18. The system according to claim 16, further including a data warehouse for storing data received from the messaging workflow module, where the messaging workflow module transfers the data to the data warehouse per instructions from one or more of the plurality of output modules.

19. The system according to claim 12, where the operational data store module provides dynamic access to the data in real-time.

20. The system according to claim 12, where prioritizing the transfer of data further includes storing data for transfer at a later time.

21. An information managing and translation system for data received from a plurality of distributed data sources for storage in an operational data store module, the system comprising:

a messaging workflow module for managing data, where managing the data comprises receiving the data from the plurality of distributed data sources, prioritizing the received data, transmitting the received data based on the prioritization to the operational data store module, and transmitting data from the operational data store module in response to a query request; and a translation module for translating data into a specified data format; wherein the translation module receives the prioritized data from the messaging workflow module, translates the prioritized data into a specified format, and transmits the data to the operational data store module, where the operational data store module comprises one or more relational databases.

22. The system according the claim 21, wherein the system further comprises a plurality of output modules for requesting the data via the query; and where:

the translation module receives requested data from the operational data store module, translates the requested data into a specified format, and transmits the requested data to the messaging workflow module; and the messaging workflow module receives the translated requested data, prioritizes the translated requested data, and transmits the translated requested data to one of the plurality of output modules based on the prioritization.

23. The system according to claim 22, wherein managing the transfer of data further comprises prioritizing the transfer of data to each of the plurality of output modules.

24. The system according to claim 22, further including a data warehouse for storing data received from the messaging workflow module, where the messaging workflow module transfers the data to the data warehouse per instructions from one or more of the plurality of output modules.

25. The system according to claim 22, where the operational data store module provides dynamic access to the data in real-time.

26. The system according to claim 22, where prioritizing the received data further includes storing data for transfer at a later time.

* * * * *